(12) United States Patent
Fleisher

(10) Patent No.: US 7,420,072 B2
(45) Date of Patent: Sep. 2, 2008

(54) APPARATUS AND METHOD FOR PRODUCING BIODIESEL FUEL

(75) Inventor: Christian A. Fleisher, Tulsa, OK (US)

(73) Assignee: Orbitek, Inc., Tulsa, OK (US)

( * ) Notice: Subject to any disclaimer, the term of this patent is extended or adjusted under 35 U.S.C. 154(b) by 0 days.

(21) Appl. No.: 11/789,824

(22) Filed: Apr. 26, 2007

(65) Prior Publication Data
US 2007/0260079 A1 Nov. 8, 2007

Related U.S. Application Data

(60) Provisional application No. 60/798,225, filed on May 5, 2006.

(51) Int. Cl.
C11C 1/02 (2006.01)
C11C 3/10 (2006.01)

(52) U.S. Cl. ........................ 554/169; 554/163

(58) Field of Classification Search ................. 554/163, 554/164, 167, 169, 184
See application file for complete search history.

(56) References Cited

U.S. PATENT DOCUMENTS

| | | | |
|---|---|---|---|
| 4,164,506 A | 8/1979 | Kawahara et al. | 260/410.9 R |
| 4,695,411 A | 9/1987 | Stern et al. | 260/410.9 R |
| 4,698,186 A | 10/1987 | Jeromin et al. | 260/421 |
| 5,116,546 A | 5/1992 | Klok et al. | 554/167 |
| 5,354,878 A | 10/1994 | Connemann et al. | 554/167 |
| 5,514,820 A | 5/1996 | Assmann et al. | 554/167 |
| 5,525,126 A | 6/1996 | Basu et al. | 44/308 |
| 5,908,946 A | 6/1999 | Stern et al. | 554/167 |
| 6,015,440 A | 1/2000 | Noureddini | 44/388 |
| 6,489,496 B2 | 12/2002 | Barnhorst et al. | 554/169 |
| 6,538,146 B2 | 3/2003 | Turck | 554/169 |
| 6,642,399 B2 * | 11/2003 | Boocock | 554/167 |
| 7,145,026 B2 * | 12/2006 | Fleisher | 554/184 |
| 2002/0028961 A1 | 3/2002 | Barnhorst et al. | 554/174 |
| 2003/0032826 A1* | 2/2003 | Hanna | 554/124 |
| 2003/0229238 A1 | 12/2003 | Fleisher | 554/174 |
| 2007/0260079 A1* | 11/2007 | Fleisher | 554/174 |

FOREIGN PATENT DOCUMENTS

AU B-43519/89 * 10/1988
AU PJ1105 10/1988

* cited by examiner

*Primary Examiner*—Yvonne Eyler
*Assistant Examiner*—Yate K Cutliff
(74) *Attorney, Agent, or Firm*—Michael W. Ferrell

(57) ABSTRACT

A continuous method and apparatus for making biodiesel fuel from glycerides such as vegetable oil employs a two-stage reactor provided with recycle. Yields of 95% and greater are readily achieved in a continuous mode of operation.

19 Claims, 3 Drawing Sheets

US 7,420,072 B2

APPARATUS AND METHOD FOR PRODUCING BIODIESEL FUEL

CLAIM OF PRIORITY

This application is based upon U.S. Provisional Application Ser. No. 60/798,225 of the same title filed May 5, 2006. The priority of U.S. Patent Application Ser. No. 60/798,225 is hereby claimed and the disclosure incorporated into this application by reference.

TECHNICAL FIELD

The present invention relates, in part, to a process of producing fatty acid alkyl esters from fats and oils, useful as biodiesel fuel. The inventive process is carried out in sequential reaction coils coupled by a hydroclone separator, the coils and separator being disposed in a single vessel containing a heat exchange medium.

BACKGROUND

Fatty acids of alkyl esters are commonly known as biodiesel, a beneficial alternative fuel source due to its biodegradability, non-toxicity, and low emission profiles as compared to conventional fuel sources. Fatty acid alkyl esters are produced by transesterification; a reaction between triglycerides (animal fat and/or vegetable oil) and alcohol to form esters and glycerol.

Transesterification processes for producing alkyl esters have been known in the art. Historically, triglycerides in fats and oils have been methylated or otherwise esterified in a two-step process using an acidic catalyst, such as is described in the U.S. Pat. No. 4,695,411 to Stern et al., U.S. Pat. No. 4,698,186 to Jeromin et al., and U.S. Pat. No. 4,164,506 to Kawahara et al. Such processes included a pre-transesterification step, where fats/oils were reacted with alcohol in the presence of an acidic catalyst, and a subsequent transesterification step, where an alkaline/alcohol blend was added for the reaction completion. Transesterification processes employing alkaline catalysts, such as U.S. Pat. No. 5,525,126 to Basu et al., U.S. Pat. No. 5,908,946 to Stern et al., and U.S. Pat. No. 6,538,146 to Turck, have been known in the art, as well.

The transesterification process is known to be accelerated by using either excess alcohol for the reaction mixture or by removal of the by-product, glycerol. For Example, U.S. Patent Publication No. 2003/0032826 to Hanna is directed towards a process for the production of fatty acid esters that includes a tubular reactor having several reaction zones in series, while fresh alcohol and possibly catalyst is introduced into each reaction zone. Once the reaction mixture of the '826 publication is withdrawn from the last reaction zone, it is treated for separating the alcohol, glycerol, and fatty acid alkyl esters. The flow of the mixture within the '826 publication reactor is characterized with a Reynolds number of at least 2100. There is also U.S. Pat. No. 6,489,496 to Barnhorst et al., which is directed towards transesterification of carboxylic acid esters with alcohols in the presence of an alkaline catalyst, where the reaction product is passed through centrifugal separation to remove the glycerol. The reaction product of the '496 process may be passed either through a second centrifugal separator or recycled several times through the reactor to increase the yield of alkyl esters.

Removal of glycerol, in addition to introduction of fresh alcohol feed into the reaction, has been known in the art as well. For example, U.S. Pat. No. 5,116,546 to Klok et al. is directed towards a process for producing fatty acid lower alkyl mono-esters which comprises a first transesterification step between triglycerides and alcohol, a separation step wherein the glycerol is removed from the mixture, and a second esterification step in which fresh catalyst and alcohol are added to the remaining mixture. The '546 patent requires a residence time of 10 minutes to several hours for the first transesterification reaction and 1 hour to several hours for the second transesterification reaction, while the separation step is static and requires settling time.

Another example is U.S. Pat. No. 5,514,820 to Assmann el al., which is directed towards a continuous two-stage process for the production of lower alkyl esters in the presence of a homogenous alkaline catalyst at temperatures of up to 100° C. and under pressures of up to 10 bar. The process described in the '820 patent includes two tubular reactors in series (with a residence time of about 1-10 minutes), removal of glycerol after the first reactor, and use of fresh alcohol and catalyst feeds into the second reactor. There is also U.S. Pat. No. 5,354,878 to Connemann et al., which is directed towards a continuous multistage production of lower alkyl esters in the presence of an alkaline catalyst at temperatures of up to 100° C. The '878 patent discloses the use of a premix of fatty acids, alcohol, and catalyst fed into the top pf a column-reactor such that the rate of flow through the column is lower than the sinking rate of glycerin, which is continuously/discontinuously withdrawn from the bottom of the column. The '878 patent discloses a process that includes three such reactors, whereas a stirring reactor and a separator are located at the exit of each column reactor. See also, Australian Patent No. PJ 1105/88 (1988). However, these patents require multiple reactors in series in order to continue the transesterification process after the glycerol removal.

It is likewise known in the art to utilize a centrifuge between sequential reactors which involves multiple vessels and controls.

Despite the plentiful art, there exists a need for an efficient, cost-effective transesterification apparatus and process that provides high yield and short residence time in a compact equipment design.

SUMMARY OF THE INVENTION

The present invention is directed, in part, to an apparatus and method for producing biodiesel fuel esters by way of reacting triglycerides and alcohol, where the apparatus includes a two-stage reactor having a first reaction zone coupled to a second reaction zone. The product from the first reaction zone is separated into a product ester enriched stream and a glycerol enriched stream. The product ester enriched stream is forwarded to a second reaction zone where it is combined with fresh alcohol and catalyst in a second transesterification step. The product from the second reaction zone may be separated into a product ester stream, and a recycle stream which includes unreacted alcohol, glycerol, and a minor portion of product ester. The recycle stream may be recycled back to the first reaction zone.

Desirably, the reaction zones in the above-described process may be in the form of tubular plug flow reactors. The reactors and the separator may be disposed in a single vessel so that a common heat exchange medium reservoir is inside the vessel. A preferred heat exchange medium is water under super atmospheric pressure, for example, 20 psig or so for preferred reaction conditions discussed below. Further details concerning the plug flow reactors and related components is found in U.S. Pat. No. 7,145,026 to Fleisher, issued Dec. 5, 2006, the disclosure of which is incorporated herein by reference. The tubular reactors suitably have a diameter of from about ¼" to about 4 inches.

BRIEF DESCRIPTION OF THE DRAWINGS

The invention is described in detail below with reference to the various Figures wherein like numerals designate similar parts and wherein.

DETAILED DESCRIPTION

Figure 1:
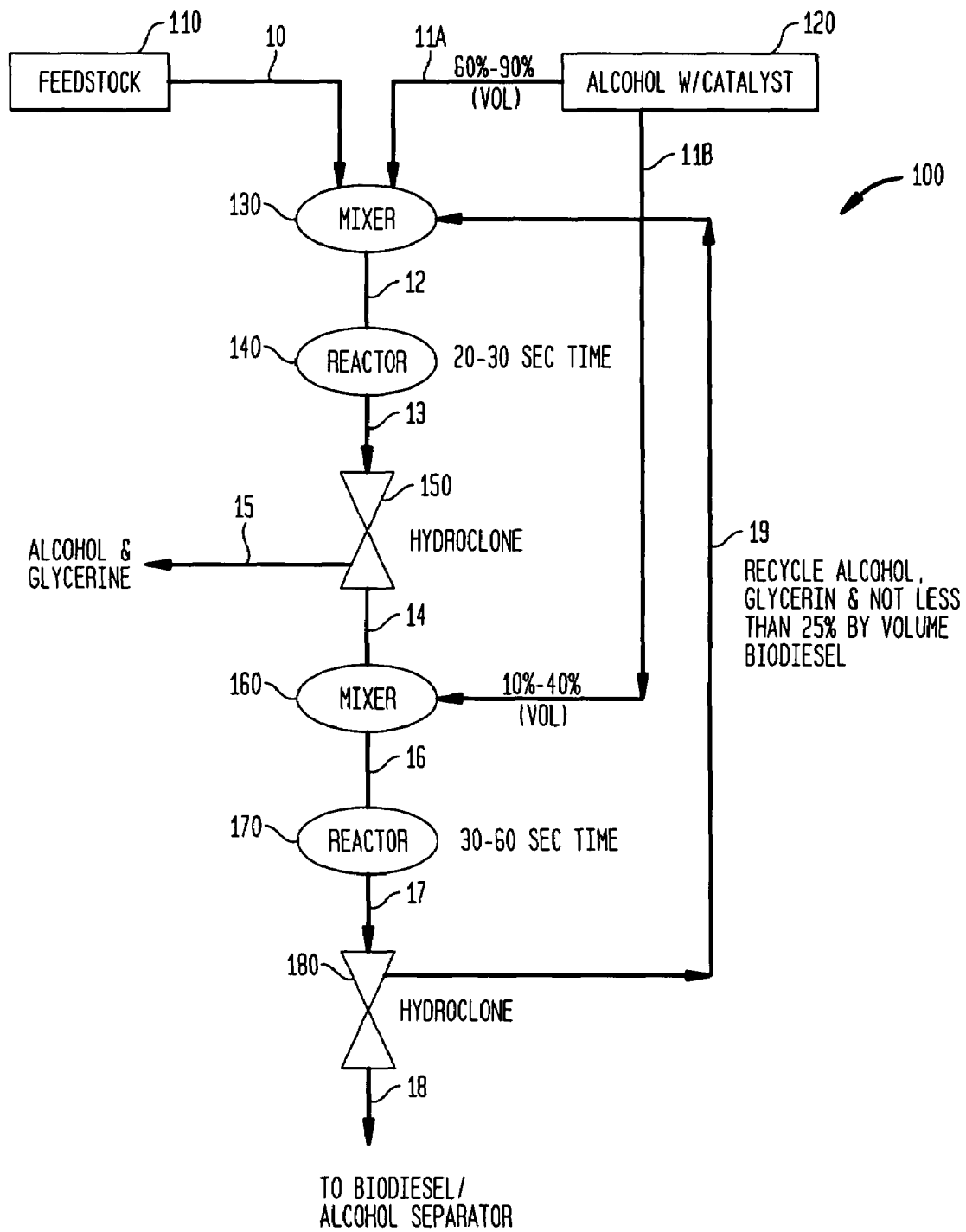
FIG. 1 is a flow diagram showing a transesterification process according to an embodiment of the present invention.

The invention is described in detail below for purposes of illustration only. Modifications within the spirit and scope of the invention, set forth in the appended claims, will be readily apparent to one of skill in the art. As used herein, terminology and abbreviations have their ordinary meaning; for example, "psi" refers to pounds per square inches, gauge pressure unless otherwise noted; "ft" refers to feet and so forth.

Transesterification is generally an equilibrium reaction, where an ester is converted into a different ester by exchange of the acid groups or by exchange of the alcoholic groups. An example of a transesterification reaction is shown below:

The first step of the process in accordance with the invention comprises a transesterification reaction wherein a triglyceride and an alcohol are reacted in the presence of a catalyst to produce a mixture comprising, as main components, fatty acid alkyl esters and glycerol. In addition, the mixture comprises unreacted and partially reacted triglycerides, remaining catalyst, soap and unreacted alcohol. The resulting mixture is then passed through the separating means to remove the glycerol. The second step of the process comprises addition of fresh alcohol and catalyst to the remaining fatty acid alkyl ester mixture to complete the transesterification reaction and increase its conversion rate. Subsequently, the final reaction mixture is treated further to separate the alkyl ester product from the by-products and unreacted reactants to achieve pure product.

As used herein, the term triglyceride has its ordinary meaning in the art as a glycerol having all of its hydroxy groups substituted by fatty acids. Examples of suitable triglyceride feedstock for use in the present invention include fats and oils of synthetic or natural origin, or mixtures thereof, comprising $C_4$-$C_{24}$, and in particular $C_{12}$-$C_{18}$ fatty acid groups, which may be straight or branched, saturated or unsaturated. Examples of such oils and fats include vegetable and/or animal sources such as corn oil, linseed oil, rape seed oil, olive oil, palm oil, canola oil, coconut oil, soybean oil, cottonseed oil, peanut oil, safflower oil, castor bean oil, tallow, lard, coca-butter, fish oils, combinations thereof, and the like. Preferably, the triglyceride feed stream introduced into the reaction zone is heated to a temperature of from about 70° C. to about 200° C. The feed stream is preferably substantially

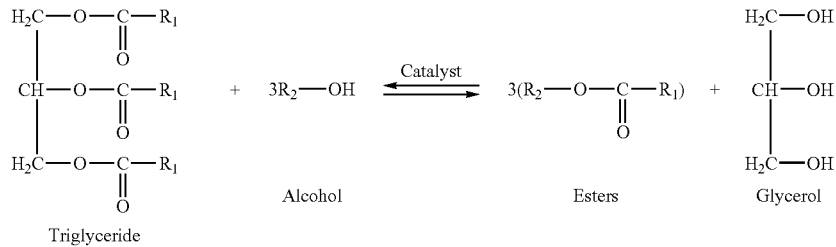

wherein $R_1$ stands for the hydrocarbyl moieties of the fatty acid constituents of vegetables oils or animal fats, and $R_2$ is a $C_1$-$C_4$ alkyl group.

As shown in the above scheme, a triglyceride is reacting with the alcohol and converted stepwise to a diglyceride, a monoglyceride and finally to glycerol with a fatty acid alkyl ester liberated at each step, resulting in 3 ester molecules. In addition to the fatty acid alkyl esters resulting in the reaction, glycerol is formed as a by-product. The equilibrium of the reaction can be shifted towards the formation of the required fatty acid alkyl esters by increasing the amount of the alcohol reactant and/or by removing the glycerol by-product.

In accordance with the present invention, a process has been discovered for an efficient, cost-effective production of fatty acid alkyl esters by a two-step transesterification of triglycerides with alcohol in the presence of a catalyst, such as a basic catalyst or acidic catalyst. The transesterification process of the present invention is carried out in a reactor system comprising a single vessel containing a mixing medium, at least two reaction zones, and a separation means within its physical embodiment.

anhydrous, <500 ppm water and preferably has a free fatty acid content of 2% by volume or less. % Conversion of triglyceride to biodiesel fuel is calculated on the basis of fatty acid present in the glyceride converted to fatty acid in the alkanol ester produced in accordance with the present invention.

Alcohols suitable for use in the present invention typically comprise any primary and secondary monohydric aliphatic alcohols having one to eight carbon atoms. Preferred alcohols for use in the transesterification process of the present invention are methanol, ethanol, propanol, isopropyl, and butanol, with methanol and ethanol being more preferred. A particularly preferred alcohol, for example, is methanol because it is of low cost, it reacts quickly and catalysts such as NaOH readily dissolve in it. As used herein, the term "alkanol" refers to monohydric alcohols as opposed to glycols or glycerols.

Suitable catalysts for the transesterification reaction include alkalis. Alkali metal catalysts suitable for the transesterification reaction of the present invention include soluble NaOH, LiOH, KOH, carbonates and corresponding sodium and potassium alkoxides such as sodium methoxide, sodium ethoxide, sodium propoxide, sodium butoxide, and sodium methylate. Catalysts may also include insoluble metals embedded upon the inner surfaces of the reactor or parts thereof (i.e. surfaces of static mixing elements such as baffles). Examples of such catalysts include tin, lead, mercury, cadmium, zinc, titanium, zirconium, hafnium, boron, aluminum, phosphorus, arsenic, antimony, bismuth, calcium, magnesium, strontium, potassium, sodium, lithium, uranium. It should be noted that the catalyst may be a combination of soluble and insoluble catalysts.

It is important to note that catalyst may be introduced into the reaction zone in any of a variety of methods which one of skill in the art would deem suitable for introducing catalyst into a reaction mass. For example, the catalyst may be introduced into the reaction zone separately from the other reactants or the catalyst may be introduced into the reaction zone simultaneously with either the triglyceride feed stream or the alcohol. When introduced simultaneously with the triglyceride feed stream, the catalyst and the triglyceride feedstock may be pre-mixed to form a catalyst-containing triglyceride feed stream to be introduced into the reaction zone. Likewise, when catalyst is introduced into the reaction zone simultaneously with the alcohol, the alcohol and catalyst may be pre-mixed to form an alcohol-catalyst solution to be introduced into the reaction zone. For convenience, the majority of the following discussion focuses on introducing the catalyst into the reaction zone simultaneously with the alcohol, preferably as a pre-mixed alcohol-catalyst solution. However, as described above, the description of such an embodiment is not intended to be limiting as to how catalyst may be introduced into the reaction zone.

In accordance with the present invention, it has been found that more efficient mixing of reactants and more favorable reaction kinetics can be achieved to provide far shorter residence times, increased throughput and, therefore, a more economical process for the production of fatty acid alkyl esters from triglycerides. More efficient mixing of the reaction mass and the attendant benefits are provided by employing turbulent flow conditions within the reaction zone. Without being bound to a particular theory, it is believed that turbulence within the reactor, and particularly within the reaction zones, causes the alcohol and the catalyst to be dispersed into the flow of reaction mass in the form of fine droplets. These fine droplets allow for improved mixing associated with the present invention as the alcohol and the catalyst can be substantially evenly distributed throughout the reaction mass to provide a large interfacial reaction area that results in an increased reaction rate and improved overall conversion efficiency.

The turbulent flow condition may be achieved by static mixing effects such as incorporation of at least one baffle, packing material, fluidizing packing material, or combinations thereof inside the reactor. Examples of packing material include pall rings, rasching rings, beryl saddles, inert spheres, and the like.

In a particularly preferred embodiment, the reaction vessel includes a plurality of reaction zones and separation means in series. It has been found in accordance with the present invention that introducing fresh alcohol and catalyst into several reaction zones and removal of the produced glycerol from at least one of the reaction zones within a single reactor vessel allows for more efficient reaction control in terms of temperature and reactants/catalyst contact, and accordingly, provides for increased reaction rate and significantly lower residence time of the overall process. This, in turn, contributes to an overall cost-effective process that provides for a compact single structure comprising a plug-flow reactor, hydroclone inside a single vessel, which provides a single heat-exchanger medium. It also has been found that use of multiple feeds of fresh alcohol and catalyst into the reaction zones advantageously reduces the amount of alcohol reactant necessary to effect the reaction.

The process of the invention now will be more particularly described with reference to a preferred embodiment of the invention schematically illustrated in FIG. 1. The process of the invention is implemented by contacting a triglyceride feedstock stream 10 with an alcohol/catalyst solution feed stream 11A; both streams 10 and 11A having temperature of from about 70° C. to about 200° C. and pressures of from about 150 psi to about 400 psi.

Streams 10, 11A, and 19, are mixed by mixer 130 to form mixture stream 12. Preferably, the flow of stream 12 is maintained at Reynolds numbers in the turbulent flow regime to enhance mixing. For a 1 inch inside diameter reactor (0.65" wall), from about 5 fps to about 8 fps linear velocity is preferred. It should be noted that stream 19 is a recycle stream containing unreacted alcohol, glycerol, and fatty acid alkyl esters separated by second hydroclone 180 from the final product. Stream 12 enters a first reaction zone, tubular reactor 140, where the triglyceride feedstock and alcohol are reacted in the presence of the catalyst to form an intermediate reaction mixture stream 13 comprising fatty acid alkyl esters, glycerol, unreacted triglyceride feedstock, catalyst and unreacted alcohol. Stream 13 is passed through hydroclone 150. The glycerol has a higher density than the fatty acid alkyl esters which results in a rapid and distinct separation. Therefore, the heavy phase stream 15, containing glycerol and some unreacted alcohol, is separated and removed from the bottom and transferred to a glycerol/alcohol separator such as distillation column or stripper for processing.

Referring again to FIG. 1, light phase stream 14, containing fatty acid alkyl esters and unreacted triglyceride feedstock, is combined with a fresh feed of alcohol/catalyst 11B in mixer 160 to form stream 16. In the second transesterification step, stream 16 is passed to the next reaction zone, tubular reactor 170 for further transesterification. Once the transterification reaction in the second reaction zone is complete, the reaction mixture 17 is passed through hydroclone 180 to separate it into two phases. Heavy phase 19, containing glycerol, unreacted alcohol, and at least 25% by volume fatty acid alkyl esters, is recycled and mixed in mixer 130 with streams 10 and 11A. Light phase 18, containing fatty acid alkyl esters is removed from the hydroclone into further separation stages to purify the resulting fatty acid asters into biodiesel grade fatty acid esters.

It should be noted that the amount of the alcohol/catalyst solution in stream 11A is from about 60% to about 90% by volume of the total methanol/catalyst solution used in combined streams 11A and 11B. Preferably, the amount of alcohol-catalyst solution in stream 11A is at a ratio of about 2 parts by weight of alcohol/catalyst solution to about 10 parts by weight of triglyceride present in stream 10; or, more particularly, a mole ratio of alcohol to triglyceride in mixer 130 is of from about 4:1 to about 8:1; and in any case preferably at least 3 or more.

The total amount of catalyst to be used in the transesterification reaction ranges from about 0.2 to about 2.0 percent by weight, more preferably from about 0.25 to about 1.25 percent by weight, of triglyceride entering mixer 130.

The reaction vessel of the present invention is preferably of sufficient size to contain a reactor and a hydroclone. In particular, the inside diameter of the vessel is preferably smaller that the outside diameter of the tubular reactor, such that the tubular reactor can fit concentrically inside the vessel.

The reactor in the present invention can be any type of reactor commonly used for transesterification reactions, examples of which include, but are not limited to, a reaction vessel having a stirrer or agitator, a vessel having a recirculation loop, or a static mixer within a pipe or a similar container. Most preferably, the reactor is a tubular plug-flow reactor comprised of helically coiled concentric tubes, whereas the pressure within the tubes is from about 15 psi to about 440 psi. More preferably, the pressure is from about 50 psi to about 300 psi. High pressure in the tubular reactor creates high-shear, which in turn, emulsifies the triglycerides and the alcohol and forces a quasi single-phase liquid system (i.e. maintains alcohol in a liquid state) to facilitate a higher reaction rate.

It should be noted that the pressure control is achieved by use of pumps that are part of the reactant materials source. Preferred pressures at the reactor inlet, stream 12, is about anywhere from about 175 psig to about 400 psig such as, for example, 220 psig, the most preferred pressure at the reactor outlet, stream 19, is about 150 psig, and the pressure drop across each hydroclone (150 and 170) is about 30 psig, for example, pressure drops from 210 psig to 180 psig and from 180 psig to 150 psig.

Separation in alternate embodiments of the inventive process may be achieved by any means generally known in the art, preferably by gravity separation, decantation or centrifugation; means that separate components having different densities. Most preferably, the separation is achieved by means of hydroclone. A preferred hydroclone separator is model HY20 SS222ASY manufactured by CSI. A 2" hydroclone with two body extensions providing upflow and downflow outlets of 1" and a pressure drop of approximately 30 psi under typical conditions is suitable.

The reaction mixture is held in the reaction zone for a period of time sufficient to convert substantially all the triglyceride feedstock into fatty acid alkyl esters. It has been found that the process of the present invention can be completed in less than about three minutes. It should be noted that the first transesterification step (i.e. first reaction zone) is preferably achieved in from about 20 seconds to about 30 seconds, whereas the second transesterification step (i.e., second reaction zone) is preferably achieved in from about 30 seconds to about 60 seconds.

It has been found that the process of the present invention achieves an overall conversion of from about 95% to about 99% of triglyceride feedstock into fatty acid alkyl esters achieved in a single pass through the plug-flow reactors 140 and 170. In particular, at the end of the first transesterification step, the conversion rate in stream 14 is from about 60% to about 80%. At the end of the second transesterification step, the conversion rate in stream 18 is greater than at least about 95%. More preferably, the conversion rate is greater that at least about 99%.

Figure 2:
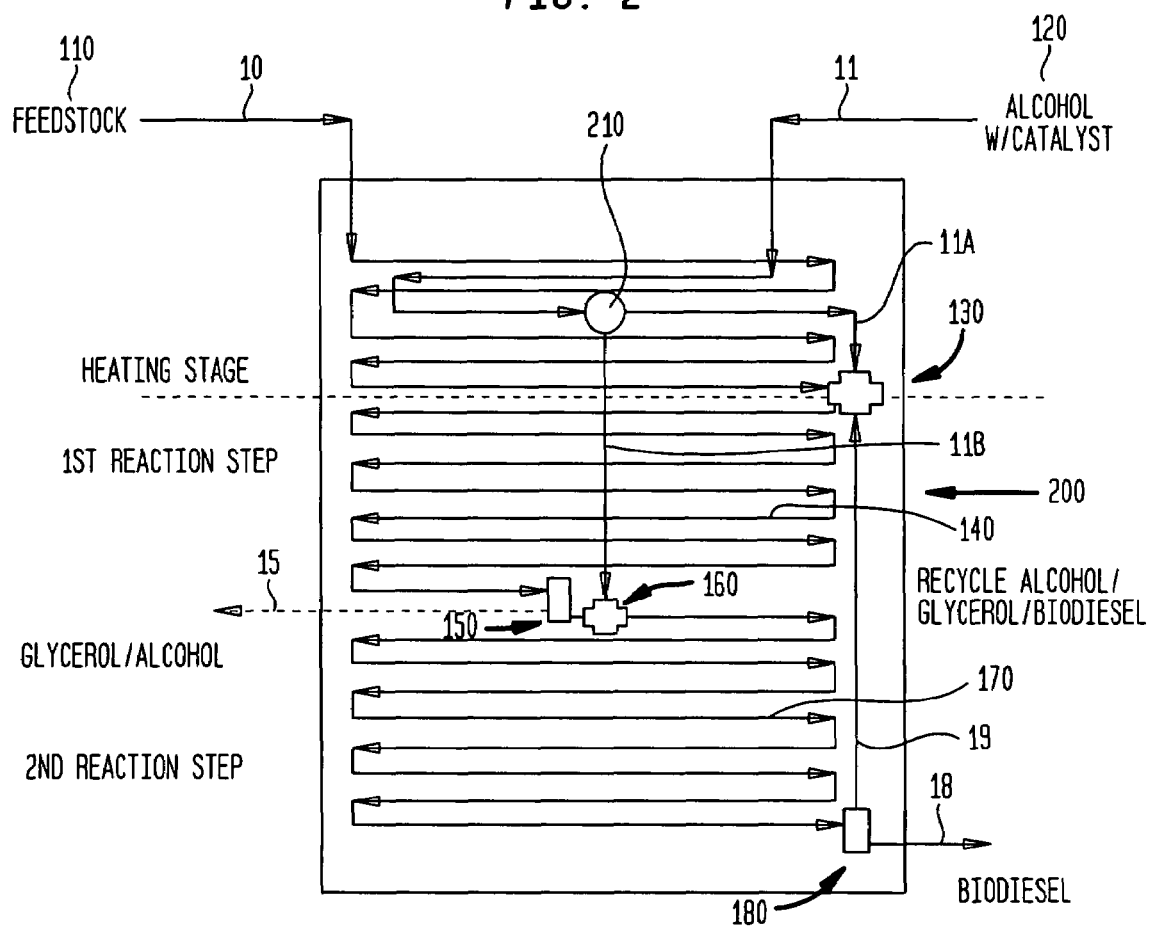
FIG. 2 is a schematic diagram showing an inside view of a reactor system that may be used for the process shown in FIG. 1.
Figure 3:
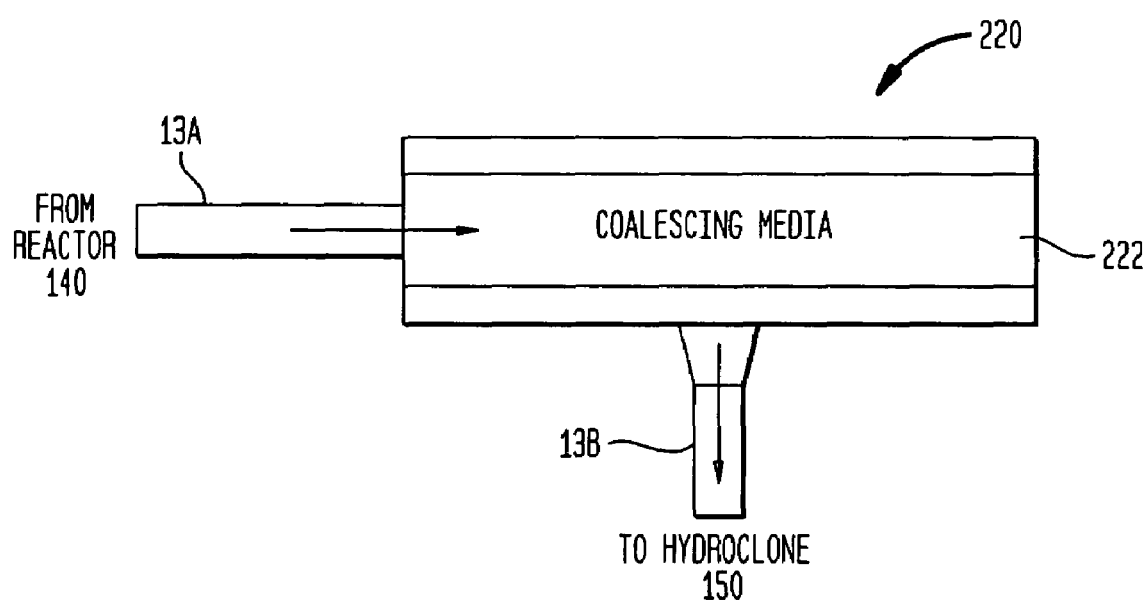
FIG. 3 is a schematic diagram of a stilling vessel and coalescing unit useful in connection with the present invention.

The process illustrated in FIG. 1 is schematically diagramed within a single vessel in FIG. 2, as preferred in the process of the present invention. As is shown in FIG. 2, reactor vessel 200 is a vertical vessel containing coiled concentric tubing as well as a single reservoir of heat exchange medium. Triglyceride feedstock 110 and alcohol/catalyst solution feed 120 are pumped at the specified pressures and temperatures, streams 10 and 11, respectively, into the top of reactor vessel 200 through coiled tubing. Stream 11 is controlled by control valve 210 such that from about 60% to about 90% of stream 11 is passed into stream 11A, whereas from about 40% to about 10% of stream 11 is passed into stream 11B. Streams 11A, 10, and recycle stream 19 are combined in mixer 130 to form a reactant mixture, which continues through plug-flow coiled tubing 140 to hydroclone 150. A heavy phase stream 15 of glycerol/alcohol is removed from hydroclone 150 and vessel 200 for further processing. The light phase is removed from the top of hydroclone 150, mixed with stream 11B of fresh alcohol/catalyst in mixer 160 and allowed to react while passing through the coiled tubing 170 to the bottom of the reactor. The final reaction product is passed to hydroclone 180, where the heavy phase 19 is recycled to mixer 130 and final product of biodiesel 18 is collected.

Further improvements to the method and apparatus of FIGS. 1 and 2 include the addition of a "stilling" vessel 220 which is coupled to the system between reactor 140 and hydroclone 150 by way of conduits 13A, 13B. Stilling vessel 220 is suitably 6-10 times in diameter to tubular reactor 140 so that the velocity of the stream is greatly reduced to facilitate separation of glycerol from the crude product stream. Optional vessel 220 further includes coalescing media 222 such as sold by Pall Corp. (New York) under the Phasex® trademark. Use of a stilling vessel and coalescing media help enlarge glycerol components of the stream, making hydroclone 150 more efficient. If so desired, a second stilling vessel with coalescing media (not shown) can be added between reactor 170 and hydroclone 180.

Suitably, recycle alcohol, glycerol, at least 20% or 35% (volume) biodiesel alkyl ester, is recycled from separator 180 to the first reactor. This layout provides for increased efficiency and allows for use of the biodiesel as a co-solvent in the process, utilizing a stream that would otherwise have to be discarded or substantially re-processed.

While the invention has been described in connection with numerous examples, modifications to those examples within the spirit and scope of the invention will be readily apparent to those of skill in the art. In view of the foregoing discussion, relevant knowledge in the art and references including co-pending applications discussed above, the relevant disclosures of which are all incorporated herein by reference, further description is deemed unnecessary.

What is claimed is:

1. A process for the production of biodiesel grade, fatty acid alkyl esters comprising:
   (a) reacting triglyceride, alcohol and catalyst in a first reaction zone to form a first intermediate reacted mixture which includes trans-esterified fatty acid ester product, glycerol, unreacted alcohol, and unreacted and partially reacted triglyceride;
   (b) removing glycerol and unreacted alcohol from the first intermediate reacted mixture to form a second intermediate reacted mixture;
   (c) feeding the second intermediate reacted mixture to a second reaction zone;
   (d) adding a fresh feed of alcohol and catalyst into the second reaction zone to form fatty acid alkyl esters and glycerol from the second intermediate reacted mixture to form a third intermediate reacted mixture;
   (e) separating alcohol, glycerol and a fraction of the fatty acid alkyl esters from the third intermediate reacted mixture to produce a recycle stream; and
   (f) recycling alcohol, glycerol and fatty acid alkyl esters recovered from said recycle stream from the third intermediate reacted mixture to the first reaction zone in an amount sufficient to act as a co-solvent of the reaction process, and further, wherein said recycle stream includes at least 20% by volume of alkyl ester.

2. The process according to claim 1, wherein the first and second reaction zones are tubular plug flow reactors operated at a pressure of from 50 psi to about 300 psi.

3. The process according to claim 1, wherein the reaction of triglyceride and alcohol is carried out in the presence of a catalyst.

4. A process according to claim 3, wherein the catalyst is an alkali selected from the group consisting of sodium hydroxide, potassium methoxide, sodium methoxide, sodium methylate and combinations thereof.

5. The process according to claim 1, wherein the alcohol includes methanol.

6. The process according to claim 1, wherein the alcohol and triglyceride are introduced into the first reaction zone in a mole ratio of alcohol to triglyceride of from about 4:1 to about 8:1.

7. The process according to claim 1, wherein the triglyceride feed stream is introduced into the first reaction zone at a temperature of from about 70° C. to about 200° C.

8. The process according to claim 2, wherein the triglyceride and the alcohol are introduced into the first reaction zone at a pressure of from 150 psi to 400 psi.

9. The process according to claim 8, wherein residence time in the tubular plug flow reactors is less than 3 minutes.

10. The process according to claim 1, wherein residence time in the first reaction zone is from 20 seconds to 30 seconds.

11. The process according to claim 1, wherein residence time in the second reaction zone is from 30 seconds to 60 seconds.

12. The process according to claim 1, wherein the amount of catalyst used is from 0.2 to about 2.0 percent by weight of triglyceride.

13. The process according to claim 1, wherein the total amount of catalyst used is from about 0.25 to about 1.25 percent by weight of triglyceride.

14. The process according to claim 1, wherein glycerol and unreacted alcohol is removed from the first intermediate reacted mixture with a hydroclone.

15. The process according to claim 1, wherein alcohol, glycerol and fatty acid ester are separated from the third intermediate reacted mixture with a hydroclone.

16. A process for the production of biodiesel fuel fatty acid alkyl esters comprising:
(a) feeding a fatty acid triglyceride, an alkanol and catalyst to a first tubular reaction zone;
(b) transesterifying the fatty acid triglyceride in the first tubular reaction zone to produce a first intermediate stream comprising fatty acid alkyl ester and glycerol;
(c) removing glycerol from said first intermediate stream to produce a second intermediate stream;
(d) feeding the second intermediate stream along with additional catalyst and additional alkanol to a second tubular reaction zone;
(e) transesterifying fatty acid triglyceride to produce fatty acid alkyl ester in said second tubular reaction zone to produce a third intermediate stream;
(f) separating the third intermediate stream into a crude product stream and an alkyl ester containing recycle stream; and
(g) recycling in an amount sufficient to act as a co-solvent for the reaction process, the recycle stream to the first reaction zone,
wherein the overall conversion of triglyceride to fatty acid alkyl ester in the process is greater than 95%, and wherein said recycle stream includes at least 20% by volume of alkyl ester.

17. The process according to claim 16, wherein the overall conversion of triglyceride to fatty acid alkyl ester in the process is greater than 99%.

18. The process according to claim 16, wherein the conversion of triglyceride at the end of the first reaction zone is from about 60% to about 80%.

19. The process according to claim 16, wherein said recycle stream includes at least 35% by volume of alkyl ester.

* * * * *